US009709242B2

(12) United States Patent
Benitez et al.

(10) Patent No.: US 9,709,242 B2
(45) Date of Patent: Jul. 18, 2017

(54) SHELL INTEGRATOR

(71) Applicant: LIGHT PRESCRIPTIONS INNOVATORS, LLC, Altadena, CA (US)

(72) Inventors: Pablo Benitez, Madrid (ES); Julio C. Chaves, Coimbra (PT); Ruben Mohedano, Madrid (ES); Aleksandra Cvetkovic, Madrid (ES); Juan Carlos Minano, Madrid (ES); Waqidi Falicoff, Talent, OR (US)

(73) Assignee: Light Prescriptions Innovators, LLC, Altadena, CA (US)

( * ) Notice: Subject to any disclaimer, the term of this patent is extended or adjusted under 35 U.S.C. 154(b) by 0 days.

(21) Appl. No.: 15/108,672

(22) PCT Filed: Jan. 5, 2015

(86) PCT No.: PCT/US2015/010117
§ 371 (c)(1),
(2) Date: Jun. 28, 2016

(87) PCT Pub. No.: WO2015/103522
PCT Pub. Date: Jul. 9, 2015

(65) Prior Publication Data
US 2016/0327236 A1 Nov. 10, 2016

Related U.S. Application Data

(60) Provisional application No. 61/964,520, filed on Jan. 6, 2014.

(51) Int. Cl.
*F21V 23/04* (2006.01)
*F21V 5/04* (2006.01)
(Continued)

(52) U.S. Cl.
CPC ............ *F21V 5/04* (2013.01); *F21V 5/045* (2013.01); *F21V 23/0457* (2013.01);
(Continued)

(58) Field of Classification Search
USPC ...... 362/276, 311.02, 308, 296.01, 335, 327, 362/257
See application file for complete search history.

(56) References Cited

U.S. PATENT DOCUMENTS

| 3,131,595 A | 5/1964 | Kalustyan |
| 5,420,720 A | 5/1995 | Gal et al. |

(Continued)

FOREIGN PATENT DOCUMENTS

| JP | 2011108605 A | 6/2011 |
| JP | 2013030426 A | 2/2013 |

(Continued)

OTHER PUBLICATIONS

International Search Report of International Application No. PCT/US2015/010117, dated Apr. 20, 2015.

(Continued)

*Primary Examiner* — Edwyn Labaze
(74) *Attorney, Agent, or Firm* — Drinker Biddle & Reath LLP

(57) ABSTRACT

A shell integrator has a hollow transparent body with inner and outer surfaces formed as arrays of lenslets. Each lenslet of the inner surface images a common source region in the middle of the hollow body onto a respective lenslet of the outer surface. Each lenslet of the outer surface forms a virtual image of the respective lenslet of the inner surface at the common source region. One integrator has a light-guide following the surface of the hollow body from an inlet end at a central region of the surface to an outlet end at a rim of the hollow body. The light-guide inlet end is shaped to (Continued)

receive light from the common source region and direct such light along the light-guide. Another integrator is generally elongated, and may be semicylindrical. Any of these integrators may have a stepped surface forming a Fresnel lens.

19 Claims, 11 Drawing Sheets

(51) Int. Cl.
G02B 3/00 (2006.01)
F21Y 115/10 (2016.01)
G02B 6/42 (2006.01)
F21Y 113/13 (2016.01)

(52) U.S. Cl.
CPC ......... *G02B 3/0037* (2013.01); *F21Y 2113/13* (2016.08); *F21Y 2115/10* (2016.08); *G02B 6/4286* (2013.01)

(56) References Cited

U.S. PATENT DOCUMENTS

| | | |
|---|---|---|
| 5,731,899 A | 3/1998 | Meyers |
| 2005/0190564 A1 | 9/2005 | Amano et al. |
| 2005/0254018 A1 | 11/2005 | Magarill |
| 2007/0152231 A1 | 7/2007 | Destain |
| 2008/0030986 A1 | 2/2008 | Ogawa |
| 2008/0316761 A1 | 12/2008 | Minano |
| 2009/0121238 A1 | 5/2009 | Peck |
| 2010/0290234 A1* | 11/2010 | Bierhuizen ............... F21V 5/04 362/311.02 |
| 2011/0075398 A1 | 3/2011 | Wheatley et al. |
| 2012/0113537 A1 | 5/2012 | Minano et al. |
| 2013/0194811 A1 | 8/2013 | Benitez et al. |
| 2013/0272015 A1* | 10/2013 | Weaver ..................... F21K 9/54 362/555 |
| 2014/0140069 A1* | 5/2014 | Premysler ............... F21S 8/085 362/308 |
| 2014/0226337 A1* | 8/2014 | Timmers .................. F21V 5/04 362/293 |

FOREIGN PATENT DOCUMENTS

| | | |
|---|---|---|
| KR | 1020090037901 A | 4/2009 |
| WO | 2008016908 A2 | 2/2008 |

OTHER PUBLICATIONS

Written Opinion of the International Searching Authority of International Application No. PCT/US2015/010117, dated Apr. 20, 2015.

* cited by examiner

- - - - RED 207
——— GREEN 208
········· BLUE 209

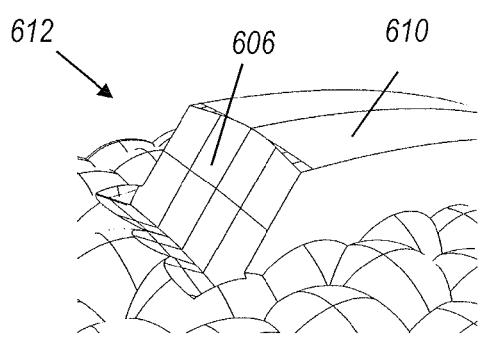
FIG. 6B
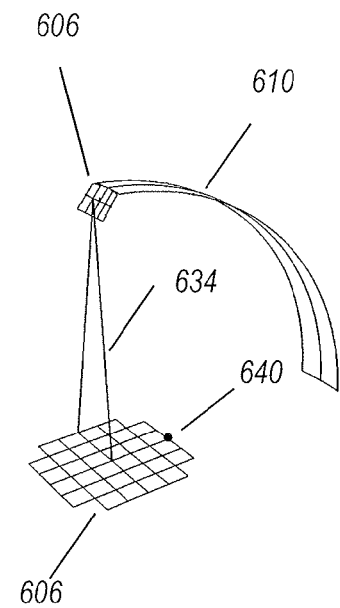
FIG. 6C
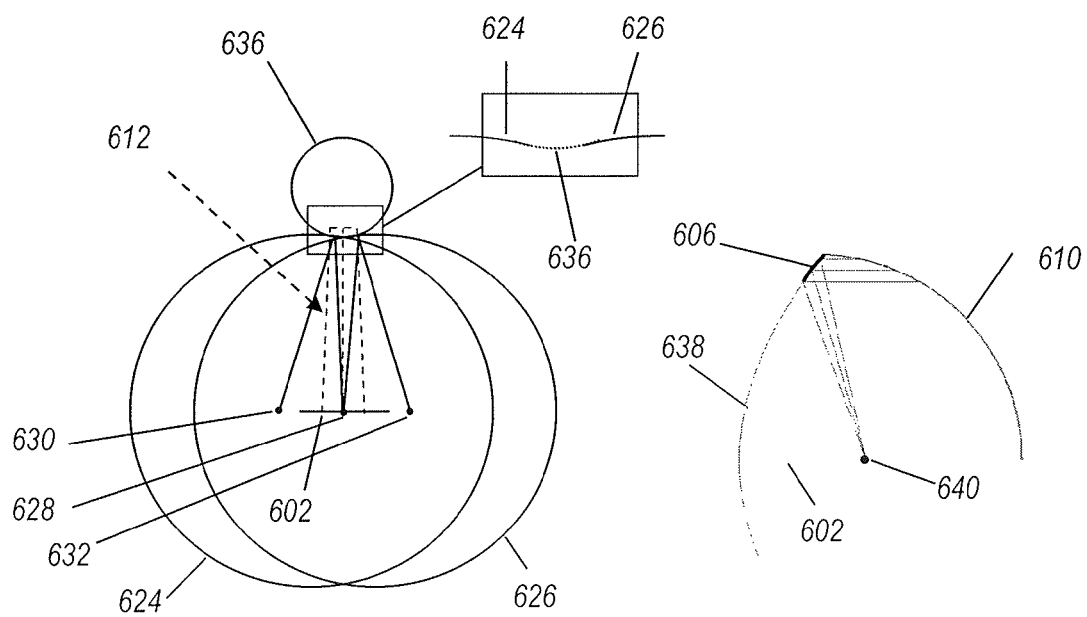
FIG. 6D
FIG. 6E

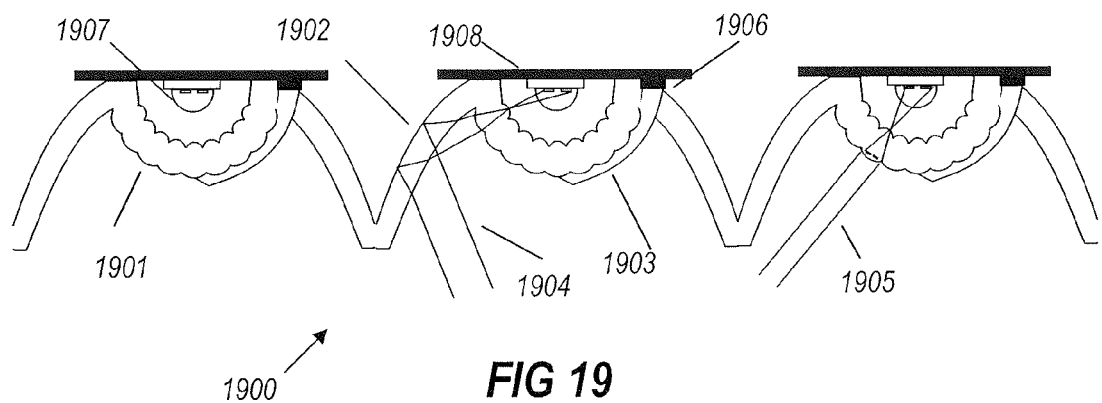
FIG 19
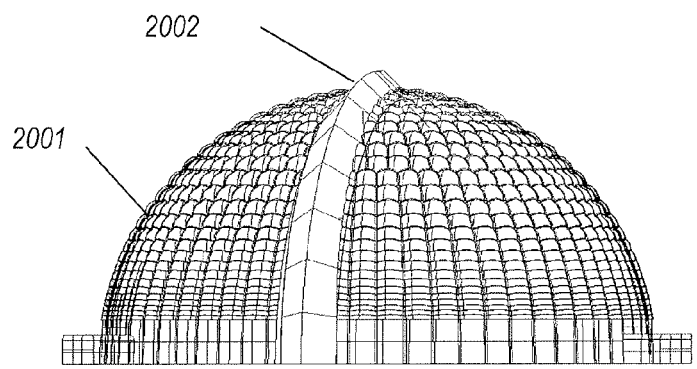
FIG 20
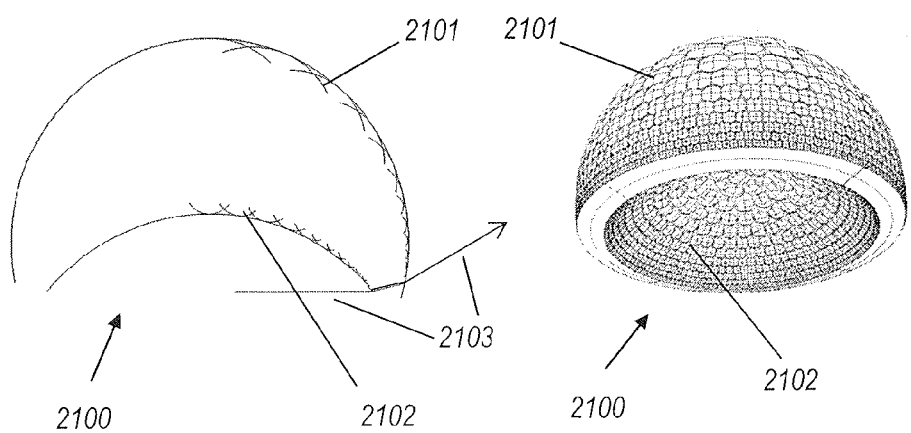
FIG. 21A  FIG. 21B

SHELL INTEGRATOR

CROSS-REFERENCE TO RELATED APPLICATIONS

This application claims benefit of U.S. Provisional Patent Application No. 61/964,520, filed Jan. 6, 2014 by Benitez et al., titled "Color/luminance tunable light engine with integrated light-guide feedback feature and sensor," which is incorporated herein by reference in its entirety.

This application is related to U.S. patent application Ser. No. 2013/0194811 of Benitez et al., published Aug. 1, 2013, titled "Shell integrator," filed on Apr. 10, 2013 as application Ser. No. 13/821,823, which is a national stage of International Patent Application No. WO 2012/040414, published 29 Mar. 2012 and claiming priority from U.S. Provisional Application 61/385,675 filed on Sep. 23, 2010, all of which patent applications are incorporated herein by reference in their entirety.

Some of the present embodiments incorporate the teachings of U.S. Pat. No. 8,094,393 and U.S. Pat. No. 8,238,050 to Miñano et al., titled "Reflectors Made of linear Grooves," which have several common inventors with the present invention, and both of which are incorporated herein in their entirety by reference.

FIELD

The present application relates to a light engine, and especially to an improvement in the homogeneity in both color and intensity of the light produced by a light engine.

BACKGROUND

It is known for light to be produced by light emitting diodes (LEDs) or similar devices. LEDs naturally produce light of a specific color. It has been proposed to combine a blue LED with a phosphor that down-converts some of the blue light to longer wavelengths, but that is inefficient and produces heat, and the light produced is not considered sufficiently white light for all purposes.

It has therefore been proposed to use multiple LEDs of different colors, with or without phosphor down-conversion. In order to produce white light, it is then necessary both to balance the intensities of the different colored LEDs, and to homogenize the light from the different colored LEDs, to whatever standard of uniformity and whiteness is required for a particular application.

In the above-mentioned co-pending U.S. patent application Ser. No. 13/821,823 there is taught a novel optic named the "shell integrator" that can homogenize an array of light sources without substantially increasing the étendue of the output beam from that of the original array.

The optical architecture taught in this co-pending patent application does improve the homogeneity of the light with regard to color and luminance. However, when a shell integrator is used in a tunable light engine, it would be desirable to determine the degree of uniformity of output of the light engine and its spectral characteristics so that adjustments can be made to achieve the desired output. It would also be desirable to be able to detect when one or more of the light-source components have either failed or have changed characteristics. Finally, it would desirable that the above enhancements to the light engine be enabled through the addition of an optical feature that can be easily incorporated into a shell mixer optic, or other primary optical elements used in conjunction with an array of light sources. Ideally this feature should have minimal negative effect on the efficiency, color mixing and luminance of the light engine. Finally, this "feedback" feature should be able to interface and work well with light sensors.

SUMMARY

In one embodiment, there is provided an optical "feedback" feature that can be added to the shell mixer optic (or to any other primary optical element or right on top of the bare light source) to enable light engine output color and luminance measurements and corrections in real time, without affecting the performance (efficiency, color mixing and high luminance) of the shell mixer or other primary optics. In one embodiment, a shell mixer is provided with a solid dielectric light-guide running from the zenith of the hemispherically-shaped shell mixer along the curve of the shell mixer to one side of the base. At the zenith, a portion of this light-guide directs light into the light-guide via a reflective feature. The reflective feature operates preferably by total internal reflection (TIR) or optionally a back-surface mirror. The dielectric portion of the light-guide is monolithically molded as an addition to the shell mixer, the embedded part replacing a small radial segment of the original optic. Also an aspect of the present embodiment is a sensor or array of sensors located at the base of this light-guide.

In one embodiment, a shell integrator comprises a hollow transparent body with inner and outer surfaces formed as arrays of lenslets, wherein each lenslet of the inner surface images a common source region in the a middle of an interior of the hollow body onto a respective lenslet of the outer surface, each lenslet of the outer surface forms a virtual image of the respective lenslet of the inner surface with an apparent position at the common source region, and a light-guide follows one of said surfaces of the hollow body from an inlet end at a central region of the surface to an outlet end at a rim of the hollow body, the light-guide inlet end being shaped to receive light from the common source region and direct such light along the light-guide.

The hollow transparent body may be a dome.

The hollow transparent body may be elongated.

Another embodiment of a shell integrator comprises an elongated hollow transparent body with inner and outer surfaces formed as arrays of lenslets, wherein each lenslet of the inner surface images a common source region in the middle of the hollow body onto a respective lenslet of the outer surface, and each lenslet of the outer surface forms a virtual image of the respective lenslet of the inner surface with an apparent position at the common source region.

In either of the last two embodiments mentioned, the elongated hollow transparent body may be generally semi-cylindrical, or may comprise a plurality of truncated domes joined at common planes of truncation. The shell integrator may then comprise a respective said light-guide on each of the truncated domes. In either case, the elongated body may end in a complete quarter dome at either or both ends.

The lenslets may be rings or arcs of rings, and may be transverse to a lengthwise direction of the elongated body.

The common source region may be an elongated region extending along the middle of the elongated hollow transparent body, and each lenslet of the inner surface may then image a respective part of the length of the common source region onto the respective lenslet of the outer surface.

The hollow transparent body may be thicker at the central region than at the rim, so as to partially collimate light emerging through the hollow transparent body from the source region. The rim may be the rim of a dome-shaped transparent body, or either or both of the two side edges of an elongated transparent body.

At least one of the said surfaces of the hollow transparent body may be stepped, so that each step is thicker at a side towards the central region than at an outer side, the steps form a Fresnel lens, and the shell integrator partially collimates light emerging through the hollow transparent body from the source region.

The hollow transparent body and the light-guide may be in a single monolithic piece.

The light-guide may comprise a rib having two faces forming a V-shaped cross-section that guide light by total internal reflection.

A luminaire may comprise any of the above-mentioned shell integrators with a light-guide, a light emitter at the common source region, and a light sensor at the outlet end of the light-guide, operative to receive light from the light emitter through the light-guide, and to control the light emitter by negative feedback.

Another embodiment of a shell integrator comprises a hollow transparent body with inner and outer surfaces formed as arrays of lenslets, wherein each lenslet of the inner surface images a common source region in the middle of the hollow body onto a respective lenslet of the outer surface and each lenslet of the outer surface forms a virtual image of the respective lenslet of the inner surface with an apparent position at the common source region, and a reflector comprising a plurality of ribs or grooves each having two faces forming a V-shaped cross-section, arranged so that light from the common source region, emerging from lenslets of the outer surface of the hollow transparent body, reflects off one face of one of the ribs or grooves, then reflects off the other face of the same rib or groove, and exits in a desired direction.

The reflector may be arranged to direct such light to exit in a generally collimated beam.

The hollow transparent body and the reflector may be in a single monolithic piece.

The ribs or grooves may be ribs on a surface of the reflector facing away from the hollow transparent body, and such light may be reflected by total internal reflection within the ribs.

The shell integrator may combine features of two or more of the above-mentioned embodiments.

By combining embodiments of the shell mixer and of the present device, some or all of the following advantages may be realized, at least in part:

The resultant optical assemblage is very compact and can be molded as a single piece.

It is versatile, and is compatible with many types of chips array, provided these are arranged within the integration space of the shell integrator.

It is compatible with a wide variety of fields of application and types of luminaires using the output light.

It is compatible with a wide range of sensors.

It provides excellent color mixing.

It can achieve high optical efficiency, potentially 95% or even more.

The luminance of the source is maintained.

Automatic color/flux tuning in real-time is made possible using industry standard or proprietary sensors.

BRIEF DESCRIPTION OF THE DRAWINGS

The above and other aspects, features and advantages of the present invention will be apparent from the following more particular description thereof, presented in conjunction with the following drawings wherein:

FIG. 4, are views of an embodiment of the shell integrator similar to that of FIG. 1.

FIG. 6B is an enlarged detail of FIG. 6A.

FIGS. 6C, 6D, 6E, and 6F are diagrams of the geometrical optics.

FIG. 11, are perspective views of an elongated primary optic including several shell integrators.

FIG. 19 is a cross-section through an array of shell integrators combined with V-groove reflectors.

FIG. 20 is a front view an embodiment of a shell integrator with another embodiment of a light-guide.

FIG. 21A is an axial cross-section through another embodiment of a shell integrator.

FIG. 21B is a perspective view of the shell integrator of FIG. 21A.

DETAILED DESCRIPTION OF THE PREFERRED EMBODIMENTS

A better understanding of various features and advantages of the present invention will be obtained by reference to the following detailed description of embodiments the invention and accompanying drawings, which set forth illustrative embodiments that utilize particular principles of the invention.

Figure 1:
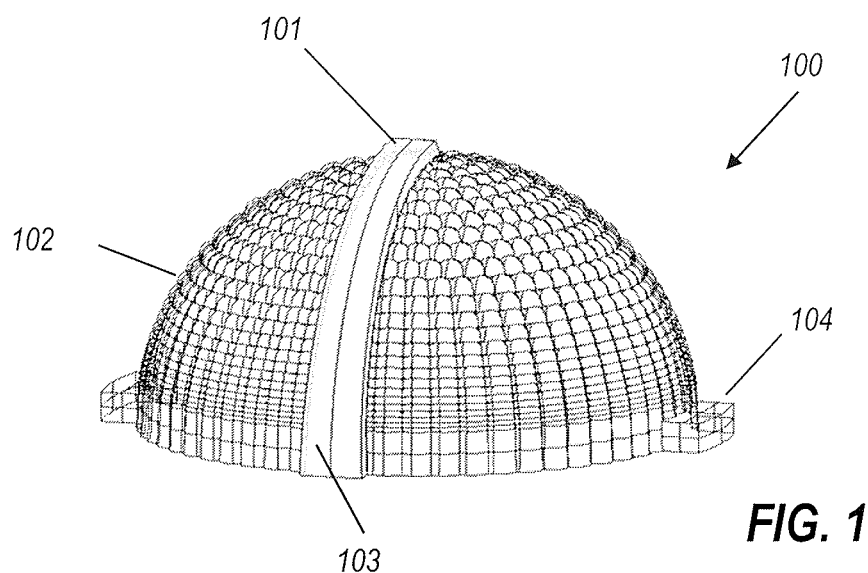
FIG. 1 is a perspective view of an embodiment of a shell integrator with a light-guide.

Referring to the drawings, and initially to FIG. 1, one embodiment of an optic 100 comprises a generally hemispherical shell integrator 102 with a light-guide 103 extending from the zenith down the curve of the hemisphere to the rim. At the zenith, the light-guide 103 is provided with a reflective facet 301*a* (see FIG. 3) to direct light from a source (not shown in FIG. 1) at the center of the hemisphere into the light-guide 103. The rim of the optic 100 may be provided with projecting lugs 104 or other formations to enable the optic 100 to be mounted as part of a luminaire. As shown in FIG. 1, the light-guide 103 is a single solid strip, molded in one monolithic piece with the shell integrator 102 from the same transparent dielectric material, with a smooth curved surface 101 that guides light by total internal reflection. Alternatively, the surface 101 may have a reflective coating. The light-guide 103 is embedded into the thickness of the shell integrator 102, but typically is a different thickness. As shown in FIG. 1, the light-guide 103 projects slightly beyond both the inside and the outside surfaces of the shell integrator. The light-guide 103 replaces a small radial segment of the original optic. As will be explained below, the resulting loss in uniformity of the light output from the shell integrator is small, and is tolerable for very many purposes. As will also be explained below, a sensor or array of sensors (see FIG. 3) is placed at the base of the light-guide.

Explanation of How Shell Mixer Works

The shell mixer, also called a shell integrator, is based on the Köhler integrator. In general, in a Köhler integrator a first optical element images a source onto a second optical element, and the second optical element images the first optical element onto a target. Where the intended target is sufficiently distant, the second optical element can be regarded as forming a virtual image of the first optical element approximately at the location of the source. This can produce very efficient homogenization of the light from the source, as well as transforming the shape of the illuminated area at the target, which is determined by the shape of the first optical element, not by the shape of the source. Each of the first and second optical elements may independently be, for example, a mirror, a thin lens, or one surface of a thick lens. In most embodiments of the shell integrator, the first and second optical elements are the entry and exit surfaces of a thick lens, and are formed as lenslets on the inner and outer surfaces, respectively, of the shell.

Figure 2A:
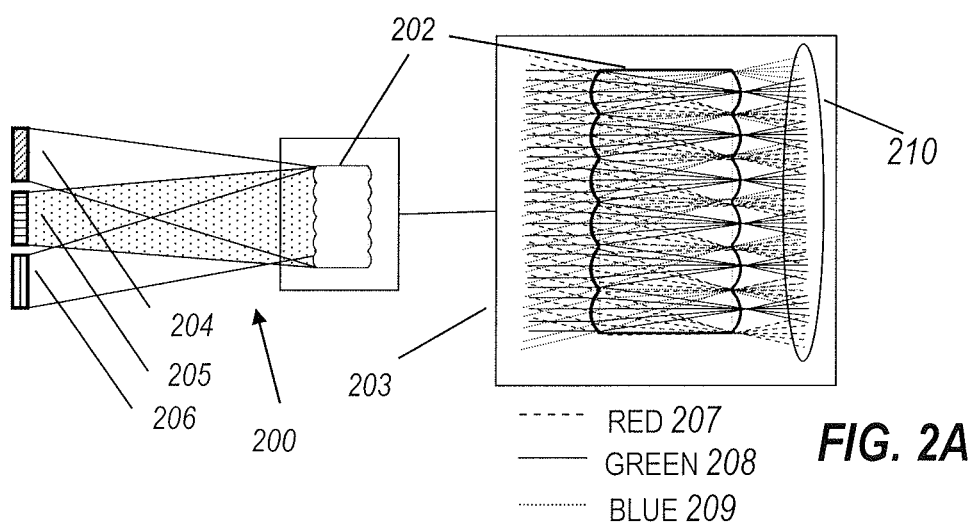
FIG. 2A illustrates the use of a Köhler integrator to homogenize colored light.

Referring to FIG. 2A, one example of a Köhler integrator used as a color homogenizer is indicated generally by the reference numeral 200. The actual Köhler optic 202 is a monolithic block of transparent material with lenslet arrays on both inlet and outlet faces. Each lenslet on the inlet face is paired with a lenslet on the outlet face to form a Köhler integrator. Three LED chips, a red chip 204, a green chip 205, and a blue chip 206 illuminate the inlet side of the Köhler optic 202. That illumination is uniform in intensity and color, but rays of different colors are going in different directions, as illustrated in the enlarged view 203, in which red rays 207 are shown as dashed lines, green rays 208 are shown as continuous lines, and blue rays 209 are shown as dotted lines. The first optical element (inlet surface lenslet) of the Köhler optic 202 images the three LED chips 204, 205, 206 onto the second optical element (outlet surface lenslet), so the light emerging at the outlet surface of the Köhler optic is not homogenous in color. However, the outlet surface lenslet images the homogenously illuminated inlet surface onto the target (far field), so the different colored beams overlap and merge to form a homogenous far field illumination beam 210. Each lenticular Köhler integrator can only illuminate a narrow field, but the array of Köhler integrators forming the optic 202 overlap to provide uniform, homogenous illumination over a wider field.

Figure 2B:
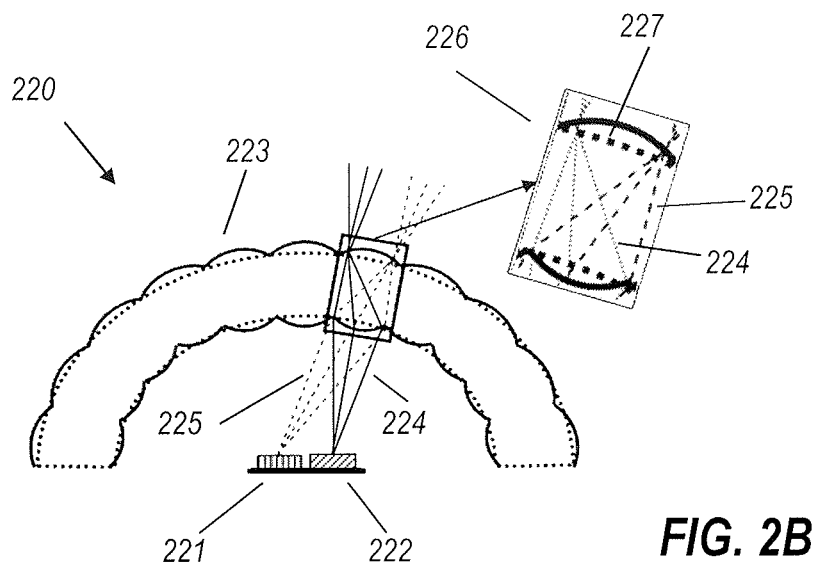
FIG. 2B illustrates the use of a Köhler integrator to homogenize colored light in a hemispherical shell integrator.

Referring now to FIG. 2B, when this principle is applied to a shell integrator 220, the LED chips 221, 222, etc. in a limited area in the center of the hemispherical optic 223 provide colored beams of light 225, 224, respectively to each lenticular Köhler integrator as shown in the enlarged detail 226. Assuming the LED chips 221, 222 provide Lambertian emission, the device as a whole will provide approximately Lambertian illumination in the far field, because each lenticular Köhler integrator distributes light over a comparatively small angle. In the interests of clarity, FIG. 2B shows only a small number of large lenticular Köhler integrators, but a practical embodiment would typically have a larger number of smaller lenticular Köhler integrators, as shown in FIG. 1. Provided the lenslets are sufficiently small compared with the diameter of the shell and the distance to the far field target, the shell integrator may be approximated for design and simulation purposes by superimposing the individual lenslets on imaginary spherical surfaces, as shown by the dotted lines 227 in FIG. 2B.

Details on the Operation of Color Tunable Optics with Sensor

Figure 3:
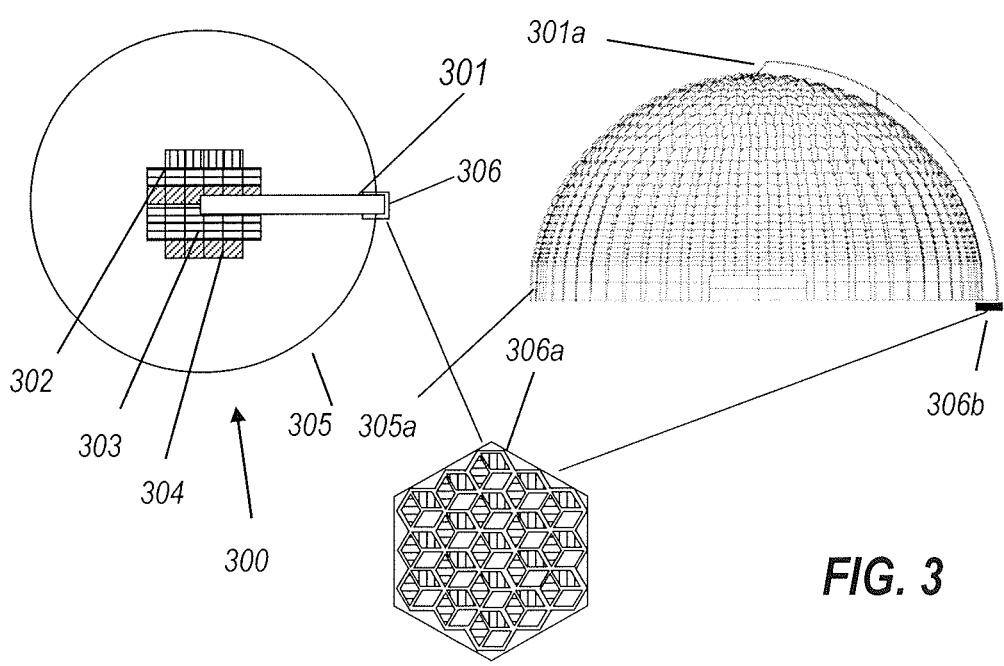
FIG. 3 shows a shell integrator with light-guide, including a sensor array for light from an LED array.

Referring now also to FIGS. 3 and 4, a stable multicolor light engine that provides well-controlled color and flux output can make use of external control and automatic regulation in the case of failure or performance modification of any of the chips. That can be done by using a color sensor. The sensor is preferably at a location where equal proportions of the light from each chip are received, or at least equal proportions of the light from all chips of a single color. Where there are chips of different colors, the sensor may receive different amounts of light, and/or may have different sensitivities to light from different colors of chip, and the difference can be corrected for in subsequent processing of the sensor output.

Color sensors are often highly sensitive and the minimum flux needed by them is quite low. But they do have some constraints. For example, the response of currently available sensors is good within certain limited incidence angles (acceptance angles requirements are typically within ±10°). Incidence angles outside the recommended acceptance angle can modify the sensor response sufficiently to produce false color interpretation. The standard solution for that problem is to put a filter limiting the incidence angle on top of the sensor, but this adds complexity to this "smart" light engine. The embodiment of FIG. 3 overcomes this restriction by sending a high fraction of the light that is sent into the light-guide, and eventually onto the sensor, within the required acceptance angle. The optical embodiments described in the following sections work with and without a filter. A suitable color sensor is the MTCSiCS true-color (XYZ color space) sensor supplied by MAZeT GmbH of Jena, Germany. However, the approach taught in the present invention should work with a number of other available sensors.

In the device 300 shown in FIG. 3, the shell integrator 305 is provided with an optical light-guide 301 that extracts a very small portion of light emitted by chips 302, 303, 304 (the rest is obviously devoted to illumination), and guides the light to a color sensor 306 (also shown as 306*b*), shown in more detail in enlargement 306*a*. The color sensor 306*a* (also shown in FIG. 4C as 404) sits in the base plane of the hemispherical shell integrator 305, which is the same plane as the array LEDs, so it can be assembled in the same PCB.

Figure 4A:
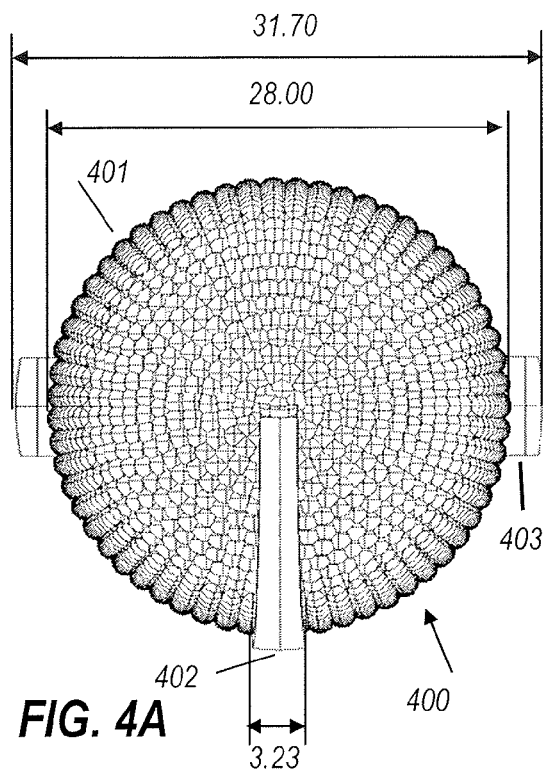
FIGS. 4A, 4B, and 4C, collectively
Figure 4B:
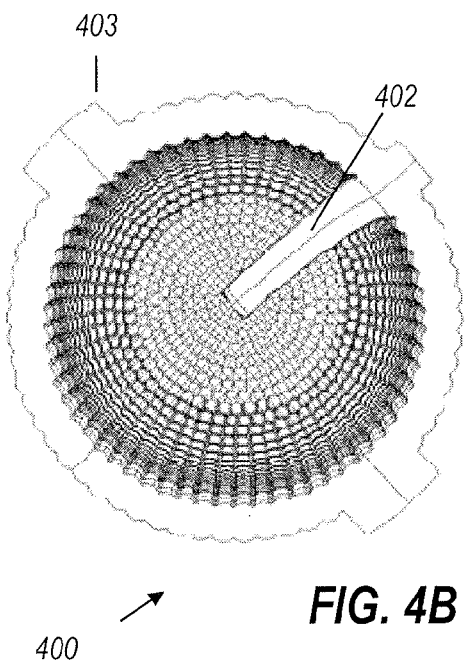
Figure 4C:
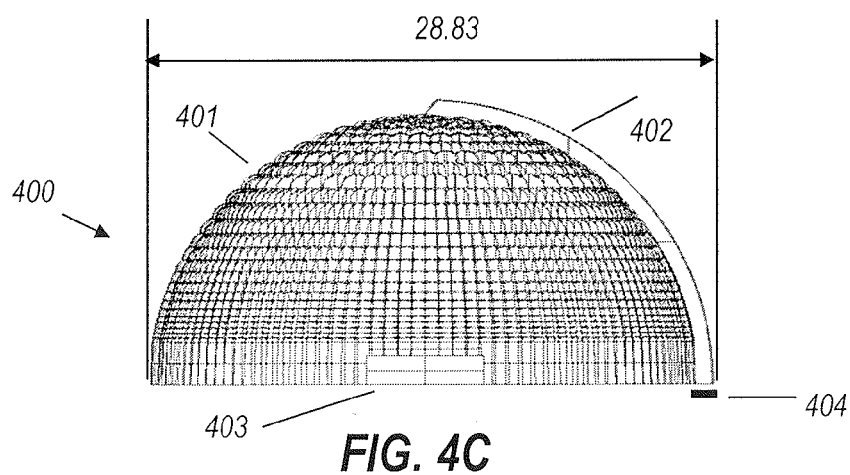

As better seen in FIG. 4A, FIG. 4B and FIG. 4C (collectively FIG. 4), the light-guide 301, 402 is bounded on the outside by a circular curve, standing proud of the outlet side lenslets of the shell integrator 305, 401, and on the inside by a circular curve recessed between the inlet side lenslets of the shell integrator. As is shown in FIGS. 1 and 4C, the inner and outer surfaces of the light-guide 101, 402 are continuous and smooth without the lenslet features of the shell mixer 102, 401. The light-guide 402 is trapezoidal as seen in plan view, because its side walls are tapered at a 2° draft angle towards the radial and axial plane through the center of the light-guide 402, to allow for demolding from a two-part mold in which one part forms the concave interior of the shell integrator and the other part forms the convex exterior of the shell integrator. At the zenith, the light-guide 301 ends in an angled, reflective surface 301*a*, which collects a small amount of light and directs the light into the light-guide 301, 402. The surface 301*a* may reflect light by total internal reflection (TIR). The other external surfaces of the light-guide 301, 402 may be mirrored, or may reflect by total internal reflection (TIR).

The output from the sensor 306 may be used to monitor the operation of the chips 302, 303, 304, and to send out an alert if one of the chips fails. The output from the sensor 306 may be used to control the power supplied to the chips 302, 303, 304, and to maintain a desired light output, either in the short term, if conditions cause the chips to operate variably, or in the long term, as the characteristics of the chips change with age. Where the chips 302, 303, 304 are chips of different colors, the output from the sensor 306 may be used to control the power supplied to each color of chip separately, so as to maintain a desired output color. If suitable user input controls are provided, the control may include dimming and/or color tuning and/or color changing.

As may be seen from FIGS. 3 and 4C, the base of the dome-shaped shell integrator 401 is formed as an approximately cylindrical drum 305*a*. With Lambertian emitting LEDs, the amount of light falling on the drum is not sufficient to justify the complication of continuing the lenticular surface 401 right down to the bottom, because overhanging shapes are formed that cannot be molded with a simple two-part mold. Therefore, the base part is formed with vertical (actually tapered at 2° draft angle for easy demolding) flutes. The flutes are easy to mold, because they follow the shape of the lenslets above them as seen in plan view (in the direction of separation of the mold halves), and provide Köhler integration in at least the circumferential (horizontal) plane.

The integrator shown in FIG. 4 was successfully used by the inventors to determine, first via ray tracing and then later by prototype testing, the performance of the optical system with the MAZeT sensor mentioned above. As an example of suitable dimensions, in a CAD model for the prototype the light-guide 402 has a maximum width as seen in plan view, FIG. 4A, of 3.23 mm: the section profile at the base is square with each side 3.23 mm. The MAZeT sensor mentioned has a hexagonal light inlet window, with a width of 2.27 mm across flats, 2.62 mm between points. The light-guide feature tapers down in width towards the zenith of the optic. At the zenith the width, as seen in FIG. 4A, is approximately ⅔ the width at the base. The height to the top of the light-guidelight-guide at the zenith is 14.8 mm. A rectangular light-guide of constant cross-section is believed to be satisfactory optically. The taper is for easier demolding. Because this embodiment is formed with a two-part mold, with the mold halves parting in the zenithal direction (perpendicular to the plane of the paper in FIGS. 4A and 4B) the 2° draft angle provided for demolding manifests itself primarily as a taper in the width of the light-guide near its lower end, and a trapezoidal cross section near the upper end. The material used for the prototype was polycarbonate LED 2245.

The external diameter of the shell mixer 401 is 28 mm. The diameter measured over the light-guide 402 is 28.8 mm, because the light-guide projects slightly proud of the shell mixer. The maximum diameter of the molded single optical assemblage 400 measured over the two mounting tabs 403, which are located on opposite sides of the base of the shell mixer, is 31.7 mm. The shell may be about 2.9 mm thick, and the Köhler integrator may be capable of integrating light from a source up to 11 mm in diameter, centered at the center of the dome. Where the source is encapsulated in a refractive dome or the like, the limiting value is the apparent diameter of the source of rays reaching the shell mixer 401. In one embodiment, an LED array (SSL4 EU) was used that had a physical diameter of 8.5 mm, but the refractive encapsulation produced a virtual image with an apparent diameter of 11 mm. An optic of this size may be used with an array of 32 LEDs, each drawing a maximum of 200 mA, corresponding to a maximum light output of a few thousand lumens. The LEDs are approximately in the plane of the base of the shell mixer 401, but exact alignment is not required. The LEDs can be lowered by at least 1 mm without perceptible deterioration in the light mixing.

However, the fundamental characteristics of the light-guide feature with respect to size, shape and location of the sensor can be employed for a wide range of LED chip array configurations. For example, the collector of the light-guide can be designed to sample an area identical to the shell mixer "integration" zone, thus assuring correct mixing of all sources.

It is desirable for the light-guide optical feature 103, 301, 402 to have following characteristics:

Optical transmission (light flux detected by the sensor as a proportion of the light emitted by the LED chips) should be substantially constant for all the chips 302, 303, 304, independent of their location, so that if any one of the LED sources fails, the sensor can detect it. The MAZeT sensor mentioned above has an acceptance angle of ±10°. With that sensor, it is desirable for the array of LED chips to be within a ±10° field of view at the collector 301*a*. Otherwise, the light-guide can be shaped to partially collimate the light passing along it to within the acceptance angle of the sensor.

The light-guide and its collector should not affect shell mixer performance (in terms of efficiency and color mixing).

Incidence angles on the sensor should be as close to perpendicular as possible: for the exemplary MAZeT sensor the angles of incidence should be <10°.

The optic should be as small as possible.

Glare coming from other parts of the shell mixer should not negatively impact the signal to noise ratio of the system.

In preferred embodiments, the features of the light-guide such as its shape, size, edges and draft angles should be compatible with injection molding technology, so it can be molded along with the rest of the shell mixer in one single shot.

Different optical approaches were explored by the inventors for a feature that provides relatively uniform illuminanceon the sensor (including some where the optical feature was a part isolated from the shell). All of them were based on light-guides that interfaced on top of the sensor. The preferred embodiment is an optical feature embedded into the original shell mixer that, according to ray traces (and later prototypes), would enable light engine output color and luminance corrections in real-time, without affecting the current shell mixer performance (efficiency, color mixing and high luminance), as specified in the design constraints.

Figure 5A:
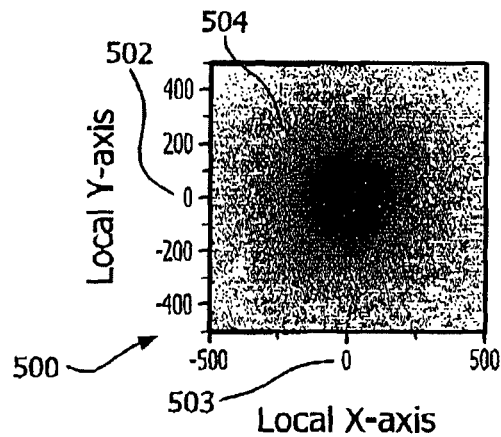
FIG. 5A is a plot of light intensity against position in two dimensions in the far field.
Figure 5B:
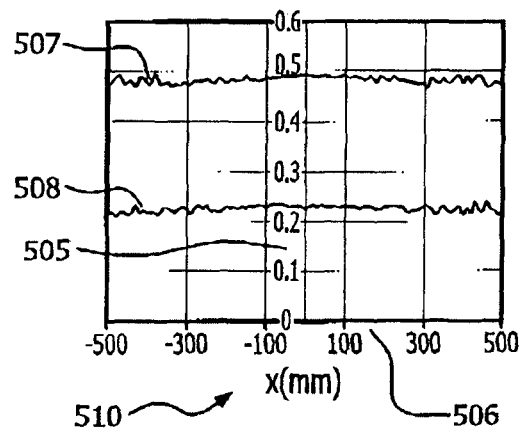
FIG. 5B is a graph of chromaticity against position.

FIG. 5A is an illuminance plot 500 of a prototype of the light engine in conjunction with a parabolic luminaire, showing the light 504 centered on the axis of symmetry of the system, at a distance of 2.5 m from the light source. The ordinate scale 502 extends from −450 mm to +450 mm. The abscissa scale 503 extends from −500 to +500 mm. FIG. 5B is a graph 510 showing the cross-section color coordinates plot of the assembly in v' units, curve 507, and u' units, curve 508, at 2.5 m away from source. The abscissa scale 506 extends from −500 to +500 mm. The ordinate scale 505 extends from 0 to 0.6. It can be seen from FIGS. 5A and 5B that there are no major color fringes or artifacts. The minor color fringes can be avoiding by adding a mirror on the upper side of the light-guide, thereby blocking stray light.

FIGS. 6A through 6F (collectively FIG. 6) show diagrammatically the flow of light through one example of a shell integrator luminaire with feedback indicated generally 600. Light is emitted by an array of LEDs 602, within a shell integrator 604. The shell integrator 604 is approximately hemispherical, and the LED array 602 is approximately in the center of the diametral plane of the base of the shell integrator 604. The LED array 602 may occupy a circular area up to about 0.4 times the diameter of the shell integrator 604. In the interests of clarity, light rays from the LED array 602 that are integrated by the shell integrator 604 and emitted as illumination are not shown.

At the zenith of the shell integrator 604 is a mirror 606 that collects a bundle of rays 608 from the LEDs 602. As shown in FIG. 6, the mirror 606 is formed by an outer surface 610 of a light-guide indicated generally 612, and reflects light by TIR. As best seen in FIG. 6F, the light enters the light-guide 612 from below at the curved bottom surface 614 of the light-guidelight-guide. Alternatively, the mirror 606 could be a surface that reflects light in an open space in front of an upright entrance surface of the light-guidelight-guide 612. The rays within ray bundle 608 are directed by the mirror 606 as rays 616 along the outer surface 610 (which is concave inwards) of the light-guidelight-guide 612. At the far end of the light-guidelight-guide, the rays 616 are collected by sensor 618. Sensor 618 measures the brightness and/or color of the rays 616, and can send a signal to the LED driver 620 for LEDs 602 to increase or decrease the light output of LEDs 602, and/or to change the color balance of light emitted by LEDs of different colors.

Figure 6A:
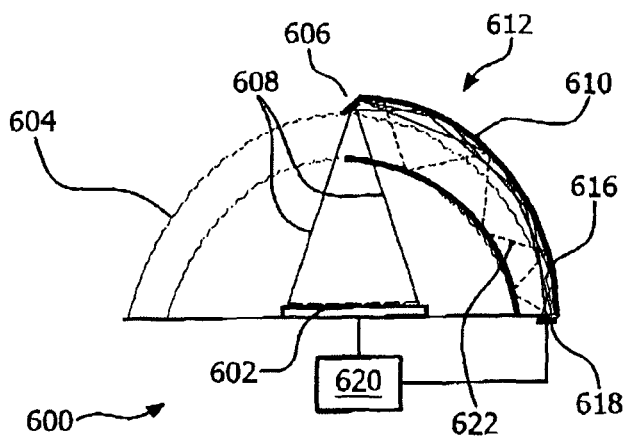
FIG. 6A illustrates the path of light from the LEDs to the sensor.
Figure 6F:
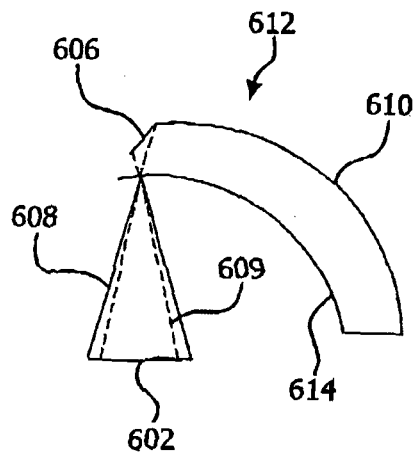

As is shown in FIG. 6A, it is preferred for the guided rays 616 to follow paths close to the outer surface 610 of the light-guidelight-guide 612. This has two advantages. First, because the rays 616 reflect off the outer surface 610 at a flat angle, they can be efficiently directed by TIR. Second, they occupy a narrow cone of angles, so they can be easily collected by color sensor 618. As mentioned elsewhere, the sensor used in Applicants' prototype has an acceptance angle of ±10°, so for that sensor it is desirable to keep the guided rays 616 within a cone of ±10°.

Rays with wider angles, as shown for example by dashed-line ray 622 in FIG. 6A, are possible. Ray 622 reflects off both the inner curved surface 614 and the outer curved surface 610 of the light-guidelight-guide 612 at fairly steep angles. If rays such as 622 are to be accepted, then both the inner and the outer curved surfaces 610, 614 may need to be metallized, at extra expense. Also, if the ray 622 zigzags at such a high angle in the radial-axial plane, it may also zigzag in the circumferential plane. Such a ray would be difficult to confine, because the light-guidelight-guide 612 is molded monolithically with the dome of the shell integrator 604, so there is no physical boundary at the sides of the light-guide for most of its height. In addition, either a light sensor 618 with a correspondingly wider acceptance angle must be used, or collimating optics may be needed at the front of the sensor.

However, if the LED array 602 occupies the full 0.4 of the diameter of a hemispherical shell integrator 604, the LED array 602 spans nearly a ±22° view angle as seen at the mirror 606. For the sensor 605 to "see" all the LED chips in the array equally, as is desirable, that ±20° view angle should be coupled to the ±10° acceptance angle of the sensor. Part of the discrepancy is absorbed by refraction at the inner surface of the light-guide. If that surface is flat, and if the material used is polycarbonate with a refractive index of 1.58, it reduces the ray bundle 608 from a cone converging at an angle of nearly ±22° to a cone 609 converging at approximately ±13.5°. In FIG. 6F, the cone 609 is shown extended backwards, to show that it forms a virtual image of the chip array 602 that is smaller than the actual chip array.

A further reduction may be achieved either by forming a lens at the inner surface of the light-guide where the ray bundle 608 enters or, as shown in FIG. 6B, by curving the reflective surface 606. It is not necessary to squeeze the étendue of the entire ray bundle 608 into the guided rays 616. It is sufficient if the light from the cone of rays 608 is sufficiently homogenized that the guided part of the rays 616 represents the whole of the LED array 606 evenly. The remaining rays can then be discarded, which in practice means that they will mostly join the emitted illumination light. Because the described embodiments are intended to provide broad-angle illumination over almost the entire upper hemisphere, it is not important if a few rays enter the output illumination at erratic angles.

Referring now primarily to FIGS. 6B through 6F, the procedure for designing the prototype shown in FIG. 6A was as follows:

Spherical profiles were selected for the outer guide surface 610 and the inner guide surface 614. The outer radius was as described above with reference to FIG. 4. The inner radius was chosen to be the same as the inner radius of the shell mixer. Both surfaces have their center at the center of the LED array 602, which is taken as the origin (0,0,0) of the coordinates. The three axial directions are X from side to side of the LED array, Y endways of the LED array (towards the light-guide 612 and the sensor 618) and Z towards the zenith.

For ease of manufacture, the light-guide is embedded into the shell integrator. This step changes the borders of the side walls of light-guide.

A 45° flat surface was initially taken as a light collector 606 for the light-guide.

The performance was checked. The principal parameter observed was the visibility of each light source in an array 602 from a sensor 618 that accepts light up to ±10°.

Figure 7A:
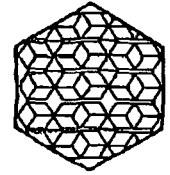
FIG. 7A shows the arrangement of chips in a sensor and an LED array.
Figure 7B:
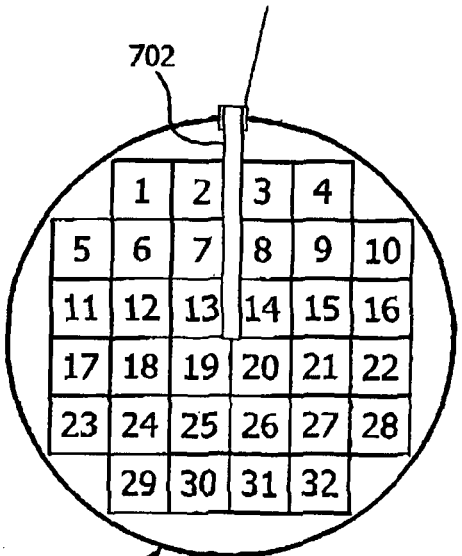
FIG. 7B is a bar chart of light-guide acceptances for the LEDs in FIG. 7A.

A large difference in visibility was initially observed between the central chips and the left/right (relative to a meridional plane including the centerline of the light-guide) border chips (see chips 5, 11, 17, 23 and 10, 16, 22, 28 in FIG. 7B). In order to reduce this difference, a horizontal curvature was introduced into the reflecting surface 606, with left/right symmetry. The profile was a pair of elliptical curves 624, 626: curve 624, with foci 628 on the center and 630 on the left side border of the chip array 602, and curve 626, with foci 628 on the center and 632 on the right side border of the chip array 602. FIG. 6C shows the radii 634 from the foci 628, 630 for the left side. Those curved surfaces 624, 626 should deflect rays that come from the border chips, so that they look as if they come from the central chips.

However, it was then found that the visibility of the central chips was much lower than the visibility of the border chips. In order to correct for that, a different curvature was chosen for a central part of the surface 606, a circle 636 with radius of 4 mm tangent on the outside of the two ellipses 624, 626, see FIG. 6D. The profile line formed by the three curves 624, 636, 626 is shown in the detail in FIG. 6D. The curves 624, 626 are of large radius, very nearly straight, and are not easily seen in FIG. 6B. The curvature is exaggerated in the detail in FIG. 6D for clarity.

Then, the design was optimized by searching for the optimum foci position. The final foci position for the prototype were F1 (±5.15,0,0) for foci 630, 632 and F2 (0,0,0) for focus 628 for the ellipses 624, 626 in FIG. 6D, with the portions of those ellipses outside their point of contact with circle 636 being the portions used for the actual profile construction.

However, the top and bottom chips (closest to and furthest from the sensor, see chips 1-4 and 29-32 in FIG. 7B) still did not have the same visibility as the central chips. To correct for that, a vertical curvature of the collecting surface was introduced, as shown in FIG. 6E). The chosen profile was the parabola 638 shown in FIG. 6E, with the focus 640 on the source plane and the axial direction parallel to the source plane. The focus position was optimized to obtain uniform chip visibility, and the chosen focus position was near the edge closest to the sensor (0,3.6,0).

The final shape of the reflecting surface 606 was thus formed by sweeping the curve with the profile 624-636-626 shown in the detail of FIG. 6D along the parabola 638 shown in FIG. 6E.

Figure 7C:
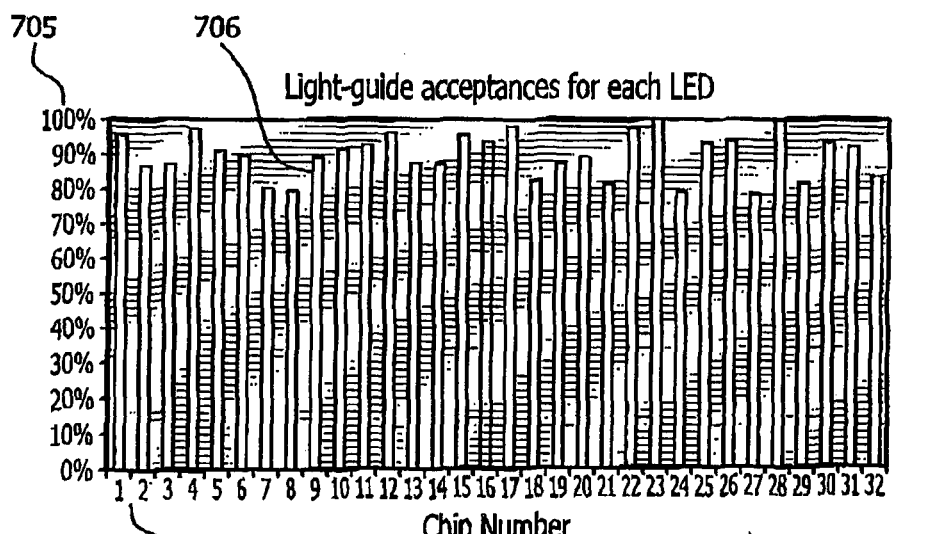

FIG. 7A shows a possible configuration of the color sensor 701. FIG. 7B shows a configuration of a 32 LED array 700, with each LED numbered from 1 to 32, and the position of the light-guide 702. FIG. 7C is a bar chart 703 of light-guide acceptance on the ordinate, normalized with 100% being the maximum, and the 32 LEDs in order from 1 to 32 along the abscissa. FIG. 7C shows that the acceptance values of the normalized flux vary from just under 80% to 100%. So the variation is approximately ±10%, which is within the limits needed to meet the typical requirements of the lighting industry for color uniformity. In addition, with a prudent choice of which colors of LED to assign to which of the 32 positions, the actual variation of color with direction will likely be considerably smaller than ±10%, because angular variations in the outputs from LEDs of the same color can to some extent be made to cancel out. Because most of the variation is static variation depending on the position of the individual LED relative to the light-guide 702, once the LED array and sensor are set up and calibrated, subsequent changes in LED output can of course be detected at a sensitivity much better than ±10%.

Proof of Manufacturability of Prototype and Performance Validation

The inventors produced a prototype of the hybrid shell mixer with embedded light-guide based on the aforementioned embodiment according to FIGS. 1 and 4. It was produced by injection molding in standard Polycarbonate 1140 plastic. A preferred material is ultra-clear Polycarbonate Makrolon LED 2245. The mold was a two-piece mold parting at the base. The actual dimensions were within the tolerances of the CAD and manufacturing systems of the dimensions given above for FIG. 4.

Figure 8:
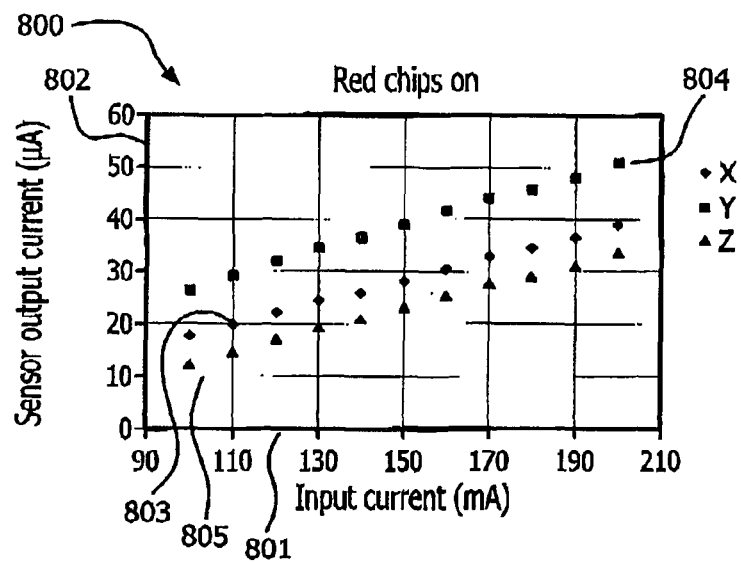
FIGS. 8 to 10 are graphs of sensor output current against LED input current.
Figure 9:
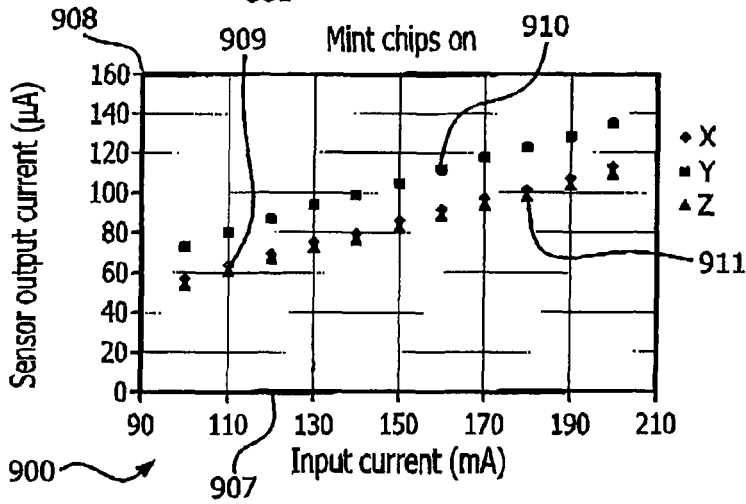
Figure 10:
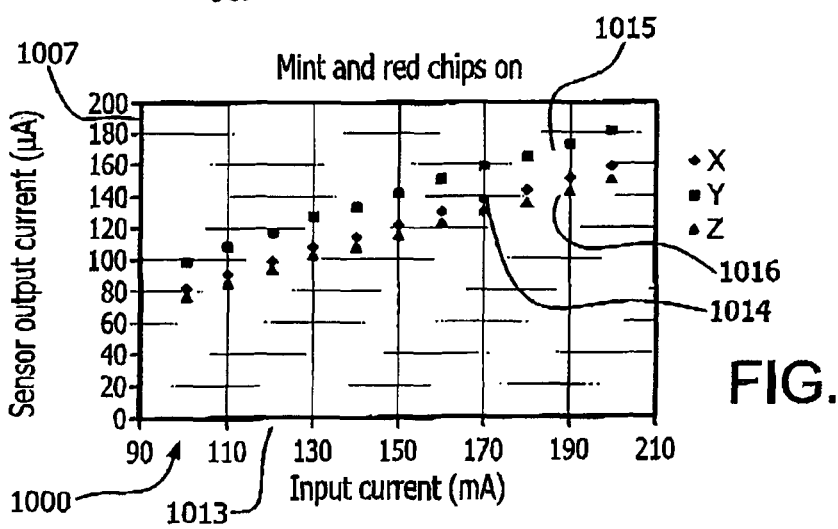

This proof of concept has been measured with different types of multi-color chip arrays: one which comprises red, green and blue chips, another a multi-color chip array using red and mint LEDs, and a third using amber, mint, and blue LEDs. The mint LED is a blue LED down-converted with a yellow/green phosphor to produce a greenish color. The signal-to-noise ratio (SNR) of the sensor output is higher than 10, which confirms the device is insensitive to both ambient stray light and glare coming from other parts of the shell. Apart from that, as FIGS. 8 to 10 show (for the array using the red and mint chips), the sensor responds linearly to bias currents increments, as expected. FIGS. 8, 9, and 10 are graphs 800, 900, 1000 respectively showing the sensor output current in µA (for each of the three color X, Y, Z color components) as a function of the different input currents in mA for three different cases. The abscissa 801, 907, 1013 extends from 90 to 210 mA input current. The ordinate 802, 908, 1017 extends from 0 to 60 µA output current. The X color component 803, 909, 1014 is marked with black diamonds. The Y color component 804, 910, 1015 is marked with squares. The Z color component 805, 911, 1016 is marked with triangles. FIG. 8 shows the case when just the red chips are on. FIG. 9 shows the case when just the mint chips are on. FIG. 10 is for the case where the mint and red LED chips are on.

Examples of Other Primary Optical Architectures

Figure 11A:
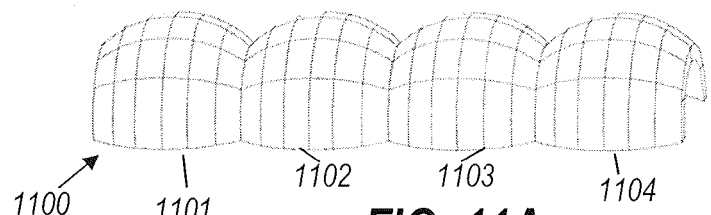
FIGS. 11A and 11B, collectively
Figure 11B:
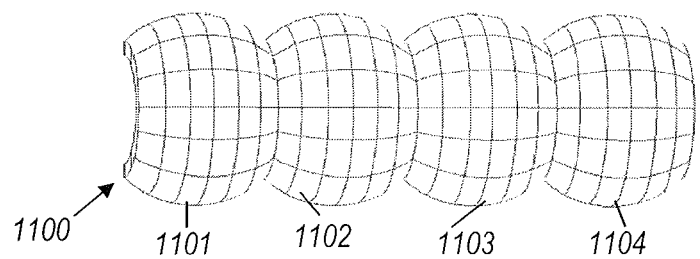

Other embodiments of the invention are possible that use primary optical architectures other than the hemispherical shell integrator shape shown in FIGS. 3 and 4. For example, the primary optical element can be more cylindrical in shape as opposed to spherical. This could be done for example by employing geometry in the longitudinal direction that is undulating or using sections of a sphere and repeating them one after the other until the desired length is reached. An example of this latter approach, which could be employed for making linear light sources such as a troffer, is shown in FIGS. 11A and 11B. FIG. 11A is an elevation perspective view of a four-element primary optic 1100, where each element 1101, 1102, 1103, 1104 is made of a portion of a spherical shell integrator. In the interests of clarity, the Köhler features are not shown but they may be the same as those shown in FIGS. 1 and 4. FIG. 11B shows a plan perspective view of the same primary optic. In an example, each element may be 20 mm wide and 14 mm long. Each of the four elements will have its own array of chips (not shown) similar to the array 305 or 700, and possibly its own light-guide (not shown) similar to the light-guide 103, 402. The end elements of the optic could be spherical at the outer ends, or be truncated as shown. There could be walls that extend to the base of the optic at the intersection of two elements, and/or closing off truncated end elements. These walls could be reflective, refractive, absorb stray light or redirect light via means that employ more than one optical principle (including combinations of reflection, refraction, and/or total internal reflection). The walls could have retro-reflective elements that send light back to the source where it originated. A portion of the light then would be recycled again. However, as LED sources act as diffuse reflectors, a significant fraction of the re-cycled light would be redirected to the primary optical elements and not returned to the retro-reflectors. In addition, the base whereon the LEDs are populated and the surrounding base can be either diffusely or specularly reflective and/or can have optical features to redirect the light in preferential directions (not shown).

Figure 12:
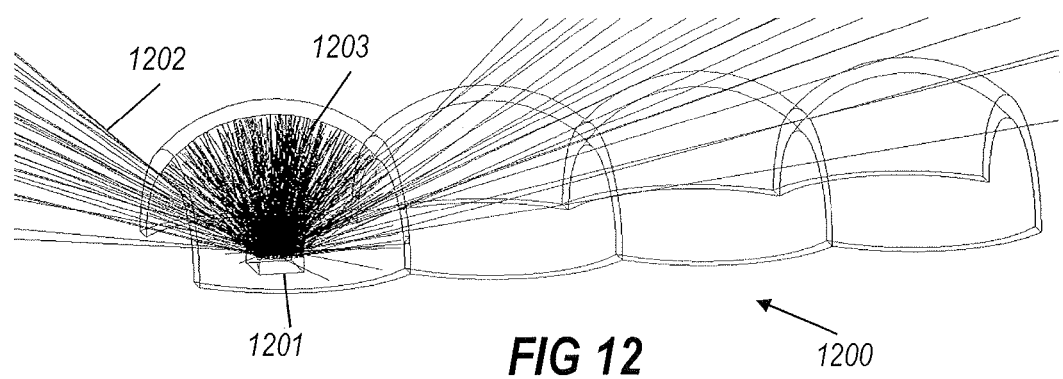
FIG. 12 is a ray-trace diagram for an optic similar to that shown in FIG. 11.

As can be seen in FIGS. 11A and 11B, the solid angle subtended by each of the spherical primary elements is very close to that of a hemisphere. So even if there was no retro-reflection or other means of redirecting the light not striking the primary optical elements, only approximately 5 to 15% would not be controlled or would potentially be lost. The loss can be further reduced if the end elements of the array of elements are not truncated. FIG. 12 shows a raytrace of a four-element primary optic 1200 with a 3×3 mm array of LED light sources 1201 at the center point of one of the end spherical elements (with a maximum dimension of 20 mm). It was assumed that the LEDs are Lambertian hemispherical emitters. For this case, the raytrace showed that the inside surface of optic 1200 received 87% of the light 1203 emitted by the LED array 1201. Only 13% of the light 1202 escapes through the open end of the optic. If the LED output is less than a hemisphere solid angle, which can be accomplished using a different primary lens cap on the LED, then the amount of the light that reaches the optic 1200 can easily be increased to over 90%.

Figure 13:
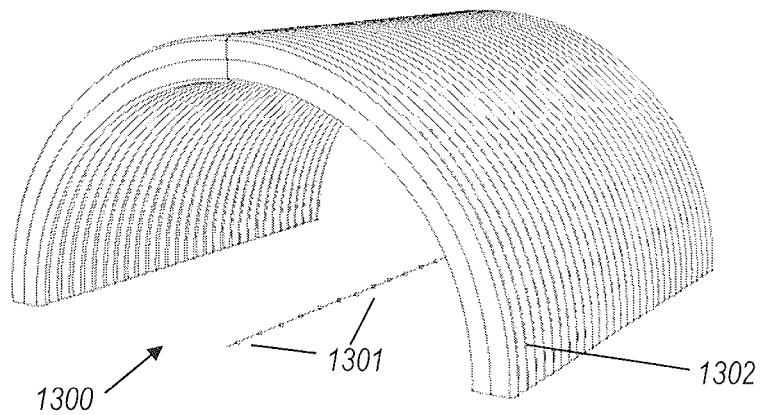
FIG. 13 is a perspective view of an embodiment with a cylindrical primary optic.
Figure 14:
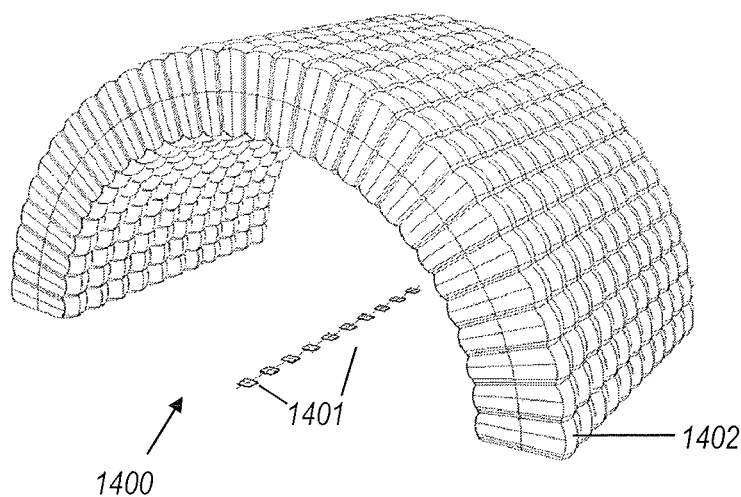
FIG. 14 is a perspective view of another embodiment with a cylindrical primary optic.

In the elongated embodiments, two types of Köhler integration approaches can be employed: one-direction integration or two-direction integration. In addition, the LED source geometry can take two simple forms: a line of emitters, usually at constant spacing, along the center of the elongated optic, or clusters of LEDs at intervals. Combining those choices offers four simple arrangements. FIG. 13 shows an embodiment 1300 with a cylindrical primary optic 1302 employing one-direction integration, where there is a linear line of emitters 1301. The primary optic 1302 is formed of rings, each of which is a Köhler integrator in the axial direction, but is uniform in the circumferential direction. FIG. 14 shows an embodiment 1400 with a cylindrical primary optic 1402 with two-direction integration with a linear line of emitters 1401. The individual integrators are similar to those shown in FIGS. 1 to 4.

In FIGS. 13 and 14, each individual integrator receives and integrates light from a short part of the length of the line of emitters 1301, 1401. The spacing between emitters should therefore be no larger than the acceptance angle of an individual integrator.

If more than one sort of LED or other emitter is used, the line of emitters 1301, 1401 desirably forms a repeating pattern with a repeat length that is no longer than the length spanned by the acceptance angle of the Köhler integrators, so that each integrator receives light of all the available colors. Most conveniently, the repeat length is equal to, or is an integer fraction of, the length spanned by the acceptance angle, and/or of the axial length of each Köhler integrating ring of the primary optic 1302, 1402.

Figure 15:
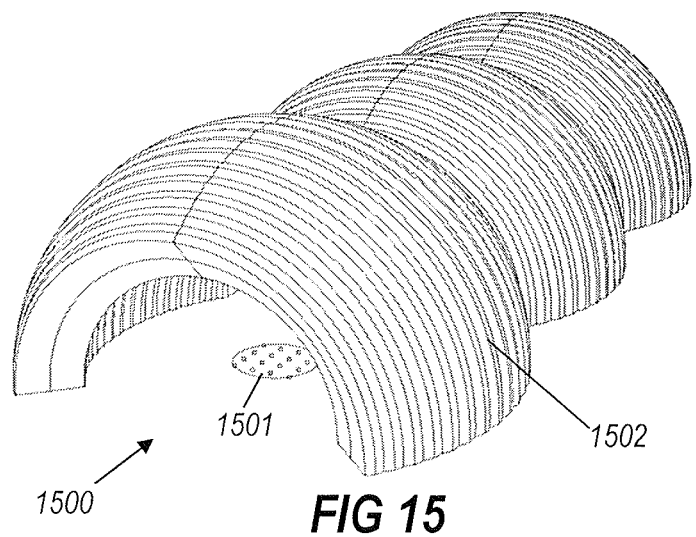
FIG. 15 is a perspective view of another embodiment including several shell integrators.
Figure 16:
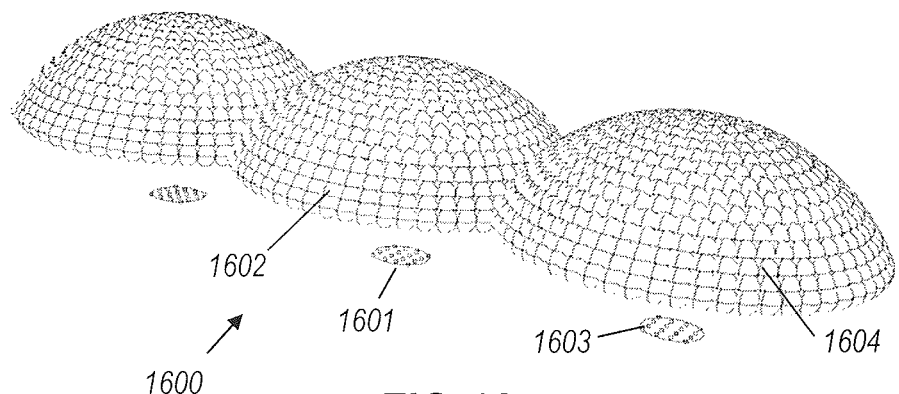
FIG. 16 is a perspective view of another embodiment including several shell integrators.

FIG. 15 shows an architecture 1500 with overlapping domes 1502, similar to those shown in FIGS. 11A, 11B, and 12, where there is one-direction Köhler integration, similarly to FIG. 13. This embodiment, like that of FIG. 12, has a multiplicity of LED arrays 1501, each situated below the center of a respective one of the dome-shaped optical shells, in the plane of the base of the optic. FIG. 16 shows an exploded view of a preferred embodiment 1600 based on a similar shape to FIG. 15, but which has two-direction integration in the domes 1602, 1604. This embodiment also has the multiplicity of 4×4 LED arrays 1601, 1603. For the above aforementioned embodiments the feedback light-guide feature 103, 402, etc. with the sensor 306, 601, 701, etc. can be incorporated. These can be located on each element of the primary optic 1100, 1200, 1502, 1600 where the primary optic is formed into distinct elements. The light-guide and sensor can then be arranged very similarly to those in FIGS. 3 and 4. Alternatively, a light-guide and sensor can be located at regular intervals along a primary optic. The latter would be appropriate for embodiments 1300, 1400 based on cylindrical architecture. Where the light emitters are clustered, one light-guide and sensor assembly may be provided for each cluster. Where the light emitters are in a uniform line, the light-guides and sensors are then desirably sufficiently close together that every light emitter is within the acceptance angle of a sensor.

Figure 17:
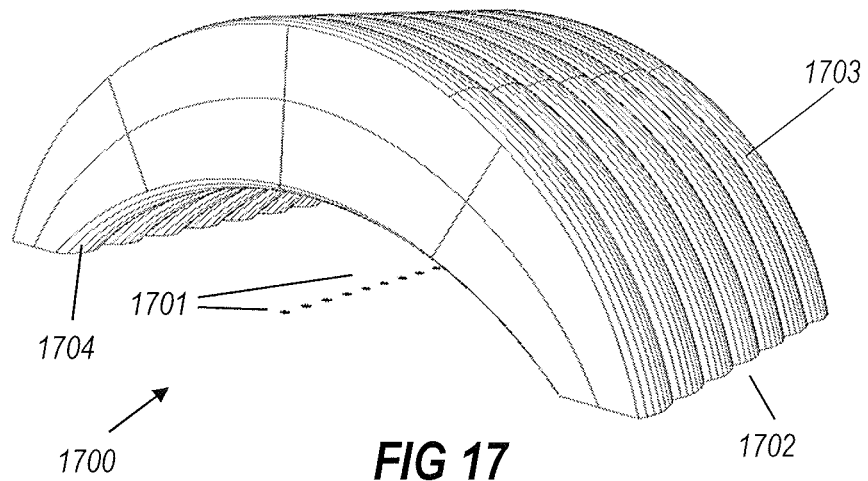
FIG. 17 is a perspective view of another embodiment with a cylindrical primary optic.
Figure 18:
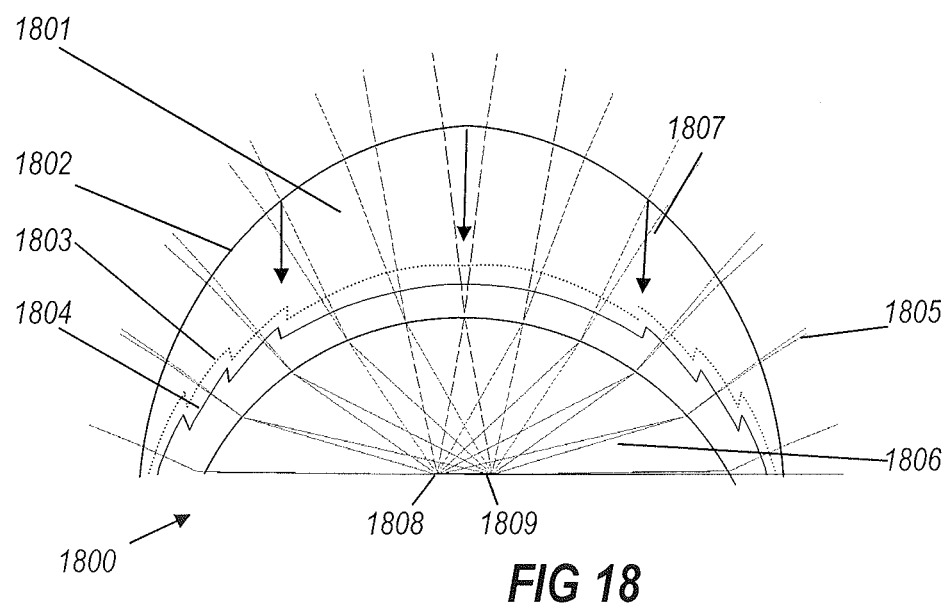
FIG. 18 is an end view of an embodiment with a cylindrical Fresnel primary optic.

FIG. 17 shows an example of an embodiment 1700 where the shell integrator 1702 also acts as a collimator. The exposed end face shows that the central part of the shell integrator lens, which is a meniscus lens, has different curvatures at its upper surface and lower surface. In this example, there is one-direction integration with a linear line of emitters 1701. Exemplary outer one-directional cylindrical lens 1703 is at the rear of the top surface of the collimating lens and exemplary inner one-directional cylindrical lens 1704 is at the front of the inner surface of the collimating lens. FIG. 18 shows an end view of a similar embodiment 1800 where the outer surface is collapsed, as symbolized by arrows 1807, so that the outlet face 1802 of the thick meniscus lens 1801 is replaced by the outer face 1803 of a Fresnel lens 1804. The inner surface of the meniscus lens may be unchanged from the embodiment of FIG. 17. The Fresnel lens has the advantage that it is thinner, which has an advantage for molding, and lighter. There can also be seen in FIG. 18 Köhler channels, as shown by ray bundles 1805 and 1806, radiating from light emitters 1808, 1809.

FIG. 19 shows a color tunable luminaire 1900 that comprises several light engines each having a shell integrator 1901 (which may be any of the circular or cylindrical designs described above), a light-guide array 1903 leading to a sensor array 1906, a V-groove reflector 1902, an LED array 1907, and a PCB 1908 that supports and connects, both electrically and logically, the LED array 1907 and the respective sensor 1906. A "V-groove reflector" is a reflector using an array of reflector elements, each having two surfaces forming a V. Rays enter the groove, and reflect off both surfaces. Those rays thus reverse direction in the plane perpendicular to the groove, while continuing their travel along the groove, and the reflected beam is shaped by a curve along the length of the V-groove. The illustrated V-groove reflectors use TIR, so that the reflected rays are inside the material, and the optical "V-groove" is physically a V-shaped rib on the rear surface of the reflector.

Rays emitted by LED array 1907 at low angles relative to the plane of PCB 1908 are integrated by the shell integrator 1901 and then collimated by the V-groove reflector 1902, as illustrated by exemplary ray bundle 1904. Rays emitted at higher angles are integrated, and may also be collimated, by the central part of shell integrator 1901, but do not encounter V-groove reflector 1902, as illustrated by exemplary ray bundle 1905. Suitable V-groove reflectors are fully described in the above-mentioned U.S. Pat. No. 8,094,393 and U.S. Pat. No. 8,238,050 and, in the interests of conciseness, that description is not repeated here. Conventional reflectors could be used instead. System 1900 has the advantage that the optical elements can all be molded as one piece, and that with V-groove reflectors operating by TIR, no metallization is needed.

FIGS. 21A and 21B, collectively FIG. 21, show a further embodiment of a generally hemispherical shell integrator 2100, incorporating a collimating meniscus lens similar to that shown in FIG. 17. As best seen in cross-section in FIG. 21A, the inner surface 2102 of the shell is curved in less than a hemisphere, and the outer surface 2101 is curved in more than a hemisphere. As best seen in perspective view in FIG. 21B, because of the non-uniform thickness of the shell integrator 2100, and because each lenticular Köhler integrator is approximately a cone frustum radiating from the light source, the visible lenslets in this embodiment are larger near the middle of the external surface. That phenomenon could be exploited for esthetic advantage. Ray tracing calculations show that a shell integrator 2100 is feasible with partial collimation to produce a beam into the far field having a cone angle of ±61°, radiating from an apparent point source that is approximately 3 mm below the base plane of shell integrator 2100 for a shell of 28 mm diameter. This is illustrated in FIG. 21A by exemplary ray 2103.

Although not explicitly shown in FIG. 21, the integrator 2100 could of course be provided with a light-guide and sensor similar to those shown in FIGS. 4 and 6. The integrator 2100 could also be made thinner and lower by using a Fresnel shape analogous to that shown in FIG. 18.

Although the above embodiments use light-guides of approximately square or rectangular cross-section, other forms of light-guide are possible. FIG. 20 shows an example of an optic 2000 having a shell integrator 2001 with a V-groove light-guide 2002.

The preceding description of the presently contemplated best mode of practicing the invention is not to be taken in a limiting sense, but is made merely for the purpose of describing the general principles of the invention. Variations are possible from the specific embodiments described. For example, the patents and applications cross-referenced above describe systems and methods that may advantageously be combined with the teachings of the present application. Although specific embodiments have been described, the skilled person will understand how features of different embodiments may be combined.

For example, an embodiment with a mixture of red and mint LED chips has been described, in which the "mint" chips provide yellow and green light by phosphor down-conversion of blue LED emission. Other combinations of colors are possible. For example, the 32 chips in array 700 in FIG. 7A may be 4 blue chips, 10 amber chips, and 18 mint chips. For example, chips 5, 11, 17, and 23 may be blue, chips 2, 7, 10, 13, 16, 19, 22, 25, 28, and 30 may be amber, and the remaining chips may be mint. Alternatively, red, green, and blue LEDs, or another combination that provides a suitable color spectrum, may be used. LEDs emitting directly in specific colors, and/or LEDs with a down-converting phosphor, may be used. The "amber" chips provide light of longer wavelength than the "mint" chips, but not as long as the red chips. One commercially available "amber" LED has a peak emission at around 590 nm, where a "red" LED may have a peak nearer to 630 nm.

The control circuitry for the negative feedback from the sensor to the LEDs may be as described, for example, in Norbert R. Malik, Electronic circuits: analysis, simulation, and design, Prentice Hall, 1995, ISBN 0023749105, 9780023749100.

For example, a specific sensor producing an output in XYZ color space has been mentioned. Other sensors, including sensors that produce outputs in other color spaces, may be used. The necessary microprocessor hardware and software to convert the sensor output to the correct color space to control the input to the LED chips is within the ordinary skill and knowledge in the art.

In the interests of simplicity, the shell integrator or shell mixer in most of the embodiments has been described as being at least approximately hemispherical or semicylindrical, with the inner and outer surfaces concentric. However, in principle any reasonable dome or tube shape may be used to suit the esthetic or optical requirements of a particular luminaire. In particular, the overall curve of the mixer could be shaped to have a specific optical function, as illustrated by the collimating lenses in FIGS. 17 and 18. Once the outline shape of the dome is known, the calculation of the array of Köhler lenslets is computationally intensive but not infeasible.

In the interests of clarity, the embodiments have been described in a specific orientation, usually with the light source in a horizontal plane and the shell integrator above that plane. For example, the term "zenith" has been used to denote the point on the surface of a hemispherical shell integrator at the center of the hemisphere, directly facing the center of an array of light sources in the base plane of the hemisphere. However, all the embodiments may be used in any orientation. Terms of orientation may explain the relative orientation or relative position of different co-operating parts of a device, but are not limiting as to the absolute position or orientation of the device as a whole, or of any part.

The full scope of the invention should be determined with reference to the Claims.

What is claimed is:

1. A luminaire comprising: a shell integrator comprising a hollow body of transparent material with inner and outer refractive surfaces formed as arrays of lenslets, wherein:
   each lenslet of the array on the inner refractive surface is paired with a respective associated lenslet of the array on the outer refractive surface;
   each lenslet of the inner surface is configured to image a common source region in a middle of an interior of the hollow body onto the respective associated lenslet of the outer surface, wherein there is a space between the common source region and the inner refractive surface; and
   each lenslet of the outer surface is configured to form a virtual image of the respective associated lenslet of the inner surface, said virtual image having an apparent position at the common source region; and
   comprising a light-guide that follows at least one of said surfaces of the hollow body from an inlet end at a central region of the surface to an outlet end at a rim of the hollow body, the light-guide inlet end being shaped to receive light from the common source region and direct such light along the light-guide;
   a light emitter at the common source region; and
   a light sensor at the outlet end of the light-guide, operative to receive light from the light emitter through the light-guide, and to control the light emitter by negative feedback.

2. The luminaire of claim 1, wherein the hollow body is a dome.

3. The luminaire of claim 1, wherein the hollow body is elongated.

4. The luminaire of claim 3, wherein the hollow body is generally semicylindrical.

5. The luminaire of claim 3, wherein the lenslets are rings or arcs of rings transverse to a lengthwise direction of the elongated hollow body.

6. The luminaire of claim 3, wherein the common source region is an elongated region extending along the middle of the elongated hollow body, and wherein each lenslet of the inner surface images a respective part of the length of the common source region onto the respective associated lenslet of the outer surface.

7. The luminaire of claim 3, wherein the paired lenslets employ one-direction integration.

8. The luminaire of claim 1, wherein the hollow body is thicker at the central region than at the rim, and partially collimates light emerging through the hollow body from the source region.

9. The luminaire of claim 1, wherein at least one of the said inner and outer surfaces of the hollow body is stepped, each step is thicker at a side towards the central region than at an outer side, the steps form a Fresnel lens, and the shell integrator partially collimates light emerging through the hollow body from the source region.

10. The luminaire of claim 1, wherein the hollow body and the light-guide are in a single monolithic piece.

11. The luminaire of claim 1, wherein the light-guide comprises a rib having two faces forming a V-shaped cross-section that guide light by total internal reflection.

12. A shell integrator comprising a hollow body of transparent material with inner and outer refractive surfaces formed as arrays of lenslets, wherein:
   each lenslet of the array on the inner refractive surface is paired with a respective associated lenslet of the array on the outer refractive surface;
   each lenslet of the inner surface is configured to image a common source region in a middle of an interior of the hollow body onto the respective associated lenslet of the outer surface, wherein there is a space between the common source region and the inner refractive surface; and
   each lenslet of the outer surface is configured to form a virtual image of the respective associated lenslet of the inner surface, said virtual image having an apparent position at the common source region; and
   comprising a light-guide that follows at least one of said surfaces of the hollow body from an inlet end at a central region of the surface to an outlet end at a rim of the hollow body, the light-guide inlet end being shaped to receive light from the common source region and direct such light along the light-guide;
   wherein the hollow body is elongated and comprises a plurality of truncated domes joined at common planes of truncation.

13. The shell integrator of claim 12, further comprising a respective said light-guide on one or more of the truncated domes.

14. The shell integrator of claim 12, wherein the paired lenslets employ one-direction integration.

15. A shell integrator comprising an elongated hollow transparent body with inner and outer surfaces formed as arrays of lenslets, wherein:
   each lenslet of the inner surface images a common source region in the middle of the hollow body onto a respective lenslet of the outer surface; and
   each lenslet of the outer surface forms a virtual image of the respective lenslet of the inner surface with an apparent position at the common source region;
   wherein the elongated body comprises a plurality of truncated domes joined at common planes of truncation.

16. The shell integrator of claim 15, further comprising a light-guide on one or more of the truncated domes that follows at least one of said surfaces of the hollow body from an inlet end at a central region of the surface to an outlet end at a rim of the hollow body, the light-guide inlet end being shaped to receive light from the common source region and direct such light along the light-guide.

17. The shell integrator of claim 15, wherein the lenslets are rings or arcs of rings transverse to a lengthwise direction of the elongated body.

18. The shell integrator of claim 15, wherein the common source region is an elongated region extending along the middle of the elongated hollow transparent body, and wherein each lenslet of the inner surface images a respective part of the length of the common source region onto the respective lenslet of the outer surface.

19. The shell integrator of claim 15, wherein the lenslets employ one-direction integration.

* * * * *